INVENTORS
JOHN YEVICK
EDWARD F. BRILL
BY
ATTORNEYS

INVENTORS
JOHN YEVICK
EDWARD F. BRILL
BY
ATTORNEYS

Fig. 24.

though the portion in the second region, and means are
provided for moving selected subassemblies from the first
region to the second region, as well as means for retaining
the subassemblies within the second region.

United States Patent Office 3,398,050
Patented Aug. 20, 1968

3,398,050
NUCLEAR REACTOR SYSTEM
John G. Yevick, Rockville, Md., and Edward F. Brill,
Oconomowoc, Wis., assignors, by mesne assignments,
to Atomic Power Development Associates, Inc., Detroit,
Mich., a corporation of New York
Filed Jan. 7, 1966, Ser. No. 519,235
9 Claims. (Cl. 176—17)

ABSTRACT OF THE DISCLOSURE

A nuclear reactor having a first region which contains a reactor core and blanket portions and a superadjacent region which is a core decay region. A plurality of liner tubes are provided, each of which contain subassemblies. Each of the tubes have a substantially constant cross-sectional area throughout the portion in the first region, and a larger second substantially constant cross-sectional area throughout the portion in the second region, and means are provided for moving selected subassemblies from the first region to the second region, as well as means for retaining the subassemblies within the second region.

---

This invention pertains to a nuclear reactor structure and to methods of operating same. Nuclear reactors embodying the concept of this invention are particularly adapted, among other possible uses, for use with a fast neutron reactor system.

The invention pertains more particularly to improvements in the structure and arrangement of the components in a fast nuclear reactor structure and to new and improved methods of operating and refueling the reactor.

The invention has, as one of its objectives, a simplification of apparatus and methods heretofore deemed necessary for operating and refueling reactors of the character aforesaid, whereby apparatus components and manipulative operations as eliminated as compared to practices of the prior art.

These and other advantages of the apparatus and methods of the invention as compared to nuclear reactor systems heretofore utilized will become apparent as the description proceeds.

A feature of the present invention resides in the provision of a new and improved nuclear reactor which has improved accessibility to the fuel elements, control elements and safety rods disposed in the reactor core and in the reactor blankets, which simplfies the fuel and control subassembly handling and replacement procedures, and which does not require side or bottom penetration of the reactor vessel for maintenance operations or control equipment.

Another feature of the invention resides in the provision of a nuclear reactor which reduces or eliminates fuel element bowing, which permits individual instrumentation of the subassemblies, which does not require removal of all control and drive mechanism during refueling operations, and which permits monitoring and control of coolant flow and coolant temperatures of each subassembly.

Still another feature of the invention is the provision of a nuclear reactor which permits storage of the subassemblies in liner tubes above the reactor core, which provides a simple means for storing subassemblies for decay within the reactor vessel itself, which permits close spacing of the fuel subassemblies in the reactor core to save fuel and permits sufficient spacing of the fuel subassemblies towards the upper end of the reactor for accessibility purposes, and which minimizes the number of steps required to refuel the reactor.

Moreover, another feature of the present invention resides in the provision of a new and improved nuclear reactor which does not require a rotary top plug, which provides simple handling mechanisms, and with which it is possible to arrange hexagonal subassemblies in a stable array so that any of the subassemblies can be removed from one of the liner tubes through a small top plug.

Another feature of this invention is the provision of a new and improved nuclear reactor with which the use of liquid control means having fail safe "features" may be employed, which provides interruptions in the streaming of neutrons from the core by transition sections, which reduces the volume of sodium required within the reactor vessel, and which limits the number of steps and simplifies the mechanism required for refueling of the reactor.

In order to achieve the aforementioned features and objects, this invention contemplates the provision of a nuclear reactor having a reactor core and blanket portions, a plurality of liner tubes, each containing a plurality of subassemblies which are disposed in an upwardly diverging conical array. Each of the sleeves has a substantially constant cross-sectional area throughout the core and blanket portions of the reactor.

Further, means are provided for removing said subassemblies from said liner tubes.

The invention in one form thereof contemplates the provision of a nuclear reactor having a plurality of sleeve members, each sleeve member having eighteen sides, twelve of which are equal and longer than the other six equal sides. Seven hexagonal subassemblies are positioned within each of the sleeve members and the sleeve members are disposed in a substantially upwardly diverging conical array.

The invention in another form thereof comprises a nuclear reactor having a first region which contains the reactor core and blanket portions and a second super adjacent region which contains a core decay region. A plurality of liner tubes are provided, each of which contains a plurality of subassemblies. Each of the tubes has a substantially constant cross-sectional area throughout the portion thereof disposed within the first region and a larger second substantially constant cross-sectional area throughout the portion thereof disposed within the second region. Means are provided for moving selected fuel subassemblies from the first region to the second region and means are provided for retaining said selected subassemblies within the second region.

The invention in still another form thereof comprises a nuclear reactor comprising a first region which contains a reactor core and blanket portions. A plurality of closely spaced liner tubes are disposed in said region and each of said tubes contains a plurality of subassemblies. Fluid material is contained in the space between the liner tubes, and the level of this material in the reactor core is controlled in order to control the energy level of the nuclear reactor. The level is controlled by means of supplying a gas under pressure which acts on the surface of the fluid material to force the fluid material from the reactor core to a location remote therefrom. A large quantity of fluid material disposed in the reactor core tends to slow down the nuclear reaction; and a small quantity thereof allows the reaction to speed up.

The invention in another form thereof comprises a method of replacing a subassembly in a nuclear reactor comprising loading a new subassembly into the subassembly handling mechanism and positioning the mechanism on top of the main plug of the nuclear reactor aligned with the opening in the corresponding liner tube, the feet of the base being guided in hemispherical guide holes disposed on top of the main plug. The method further comprises evacuation and purging the space between the top of the main plug and the valve of the subassembly handling mechanism, opening the valve of the subassembly handling mechanism, connecting a cable to the small top plug of the nuclear reactor by a gripper mechanism and removing the small top plug to a bell housing disposed within the subassembly handling mechanism, and moving the bell housing by an actuator system to a remote position.

The next steps comprise lowering a new subassembly into the liner tube and hooking same on the inside of the round portion of the liner tube by means of an electrically operated self-seeking gripper head of the parallelogram type. The subsequent steps include removing a hot subassembly from the core of the nuclear reactor and placing same in a storage position adjacent the new subassembly, then placing the new subassembly in the reactor core, and moving a decayed subassembly, which has been retained in the decay region for a substantial period of time, to a rack disposed within the outer housing of the subassembly handling mechanism, returning the bell housing to its position adjacent the main plug, lowering the small plug by the cable mechanism to its closed position, closing the valve of the handling mechanism, sweeping the space between the valve and top of the small plug with an inert gas, and finally moving the subassembly handling mechanism to a remote location.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as a basis for the designing of other structures for carrying out the several purposes of the invention. It is important, therefore, that the claims be regarded as including such equivalent constructions as do not depart from the spirit and scope of the invention. Specific embodiments of the invention have been chosen for purposes of illustration and description, and are shown in the accompanying drawings, forming a part of the specification, wherein:

Figure 1:
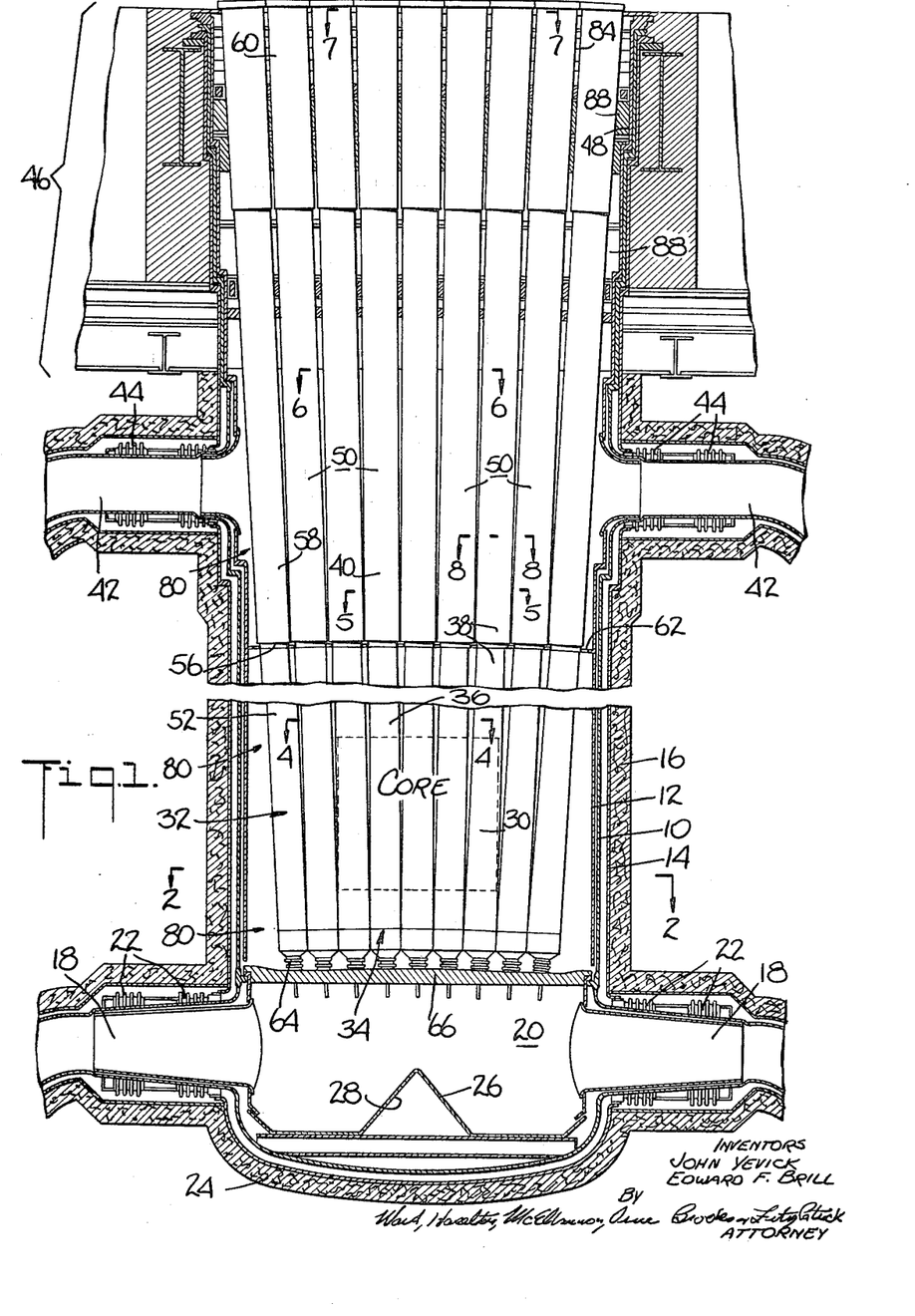
FIG. 1 is a vertical sectional view of a nuclear reactor constructed in accordance with the concepts of this invention.

In the embodiment of the invention illustrated in FIG. 1, the nuclear reactor includes a reactor vessel 10, which is preferably fabricated from stainless steel plate with stainless steel rings at transition sections of the vessel. While a cylindrical vessel is illustrated in FIG. 1, the sidewalls of the vessel could be tapered downwardly and inwardly in order to reduce the required volume of liquid coolant which may be liquid sodium, for example. A thermal baffle 12 is disposed inwardly of the reactor vessel 10, and a secondary containment tank 14 is disposed outwardly thereof. Insulation material 16 forms the outer layer of the reactor wall. Coolant inlets 18 are provided at the foot of the reactor through which the coolant, which may be sodium for example, passes to the inlet plenum 20. Still referring to FIG. 1, bellows 22 are provided in the inlets 18 for expansion purposes. A torispherical head 24 is provided as the closure means at the bottom of the reactor, and adjacent thereto is a melt-down pan 26 which can be provided with an encapsulated poison control material on the underside to prevent a critical mass formation in the melt-down pan.

Figure 2:
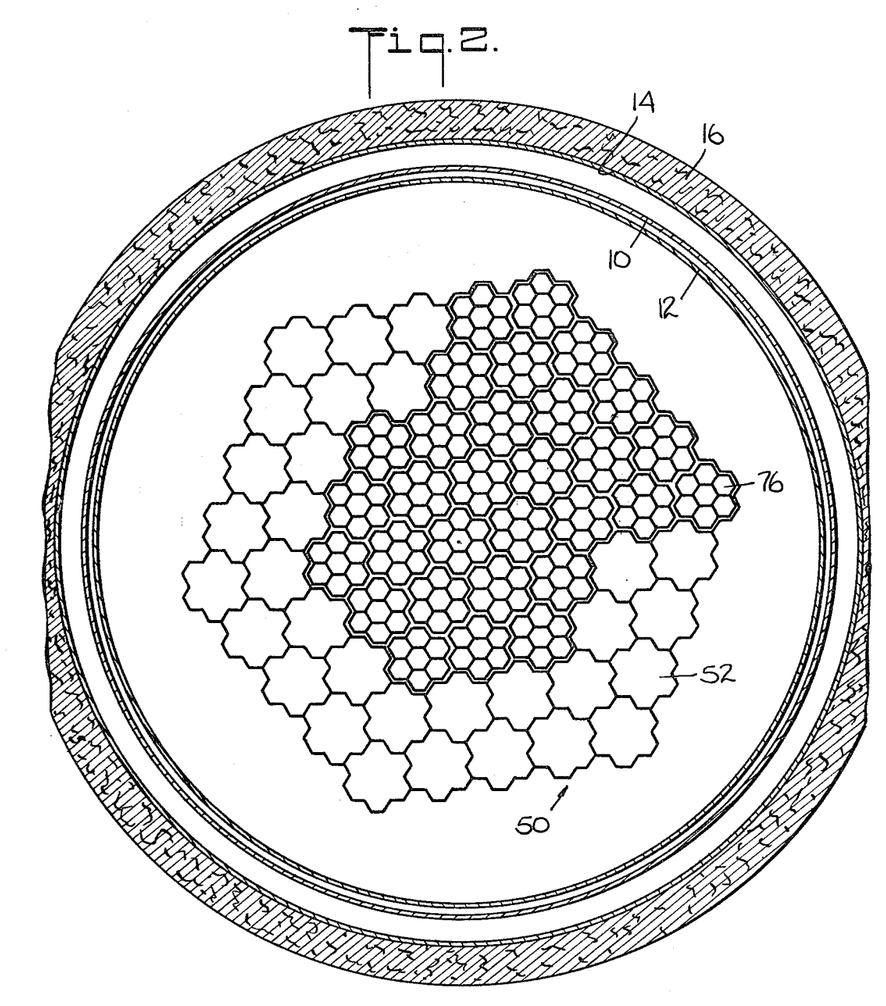
FIG. 2 is an enlarged horizontal sectional view taken along the line 2—2 of FIG. 1 and showing portions of the liner tubes and subassemblies disposed in the reactor core.

The core 30 is centrally located in the reactor and is illustrated by the dotted lines in FIG. 1. FIG. 2 is a horizontal sectional view taken along the line 2—2 of FIG. 1 and shows additional details of the core. As seen in FIG. 1, the core 30 is surrounded by a radial blanket designated generally at 32, a lower axial blanket 34 and an upper axial blanket 36. An isolation region 38 is located above the upper axial blanket 36 for storing or decaying the subassemblies. The reactor is provided with an outlet or exit plenum 40 and coolant outlets 42. The reactor is further provided with super-structure indicated generally at 46 for insertion and withdrawal of the fuel and control elements. The super-structure includes a large main plug 48 which serves as a closure means for the top of the reactor.

Figure 4:
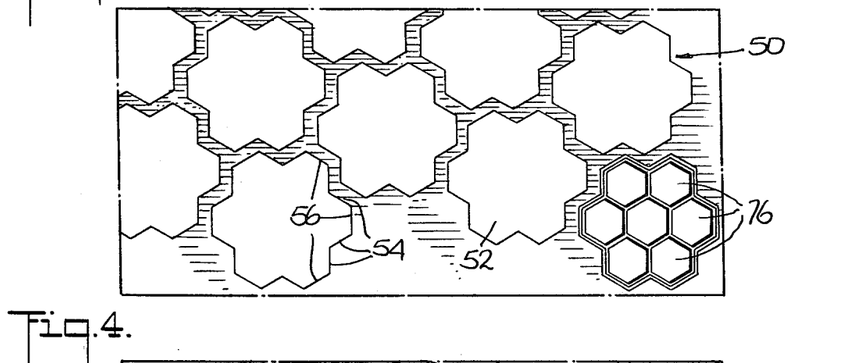
FIG. 4 is an enlarged horizontal sectional view taken on the line 4—4 of FIG. 1 and showing portions of the liner tubes and subassemblies disposed in the upper axial blanket region.
Figure 5:
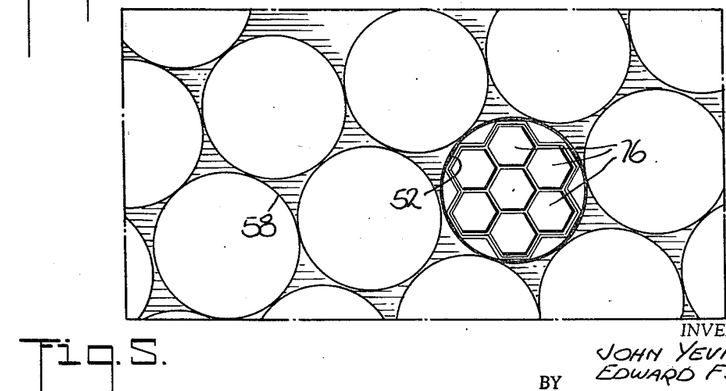
FIG. 5 is an enlarged horizontal sectional view taken on the line 5—5 of FIG. 1.
Figure 6:
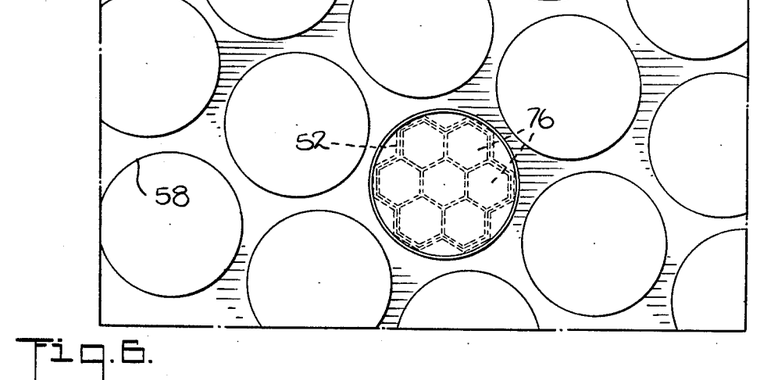
FIG. 6 is an enlarged horizontal sectional view taken along the line 6—6 of FIG. 1 and showing portions of the liner tubes and subassemblies disposed in the core decay region of the nuclear reactor.
Figure 7:
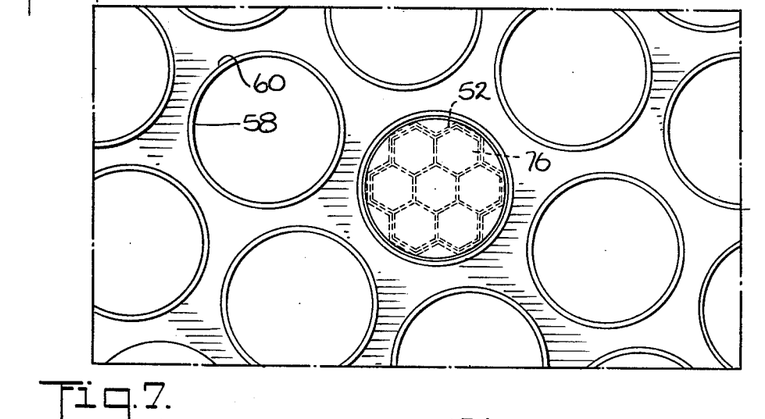
FIG. 7 is an enlarged horizontal sectional view taken along the line 7—7 of FIG 1.
Figures 8, 9, 11:
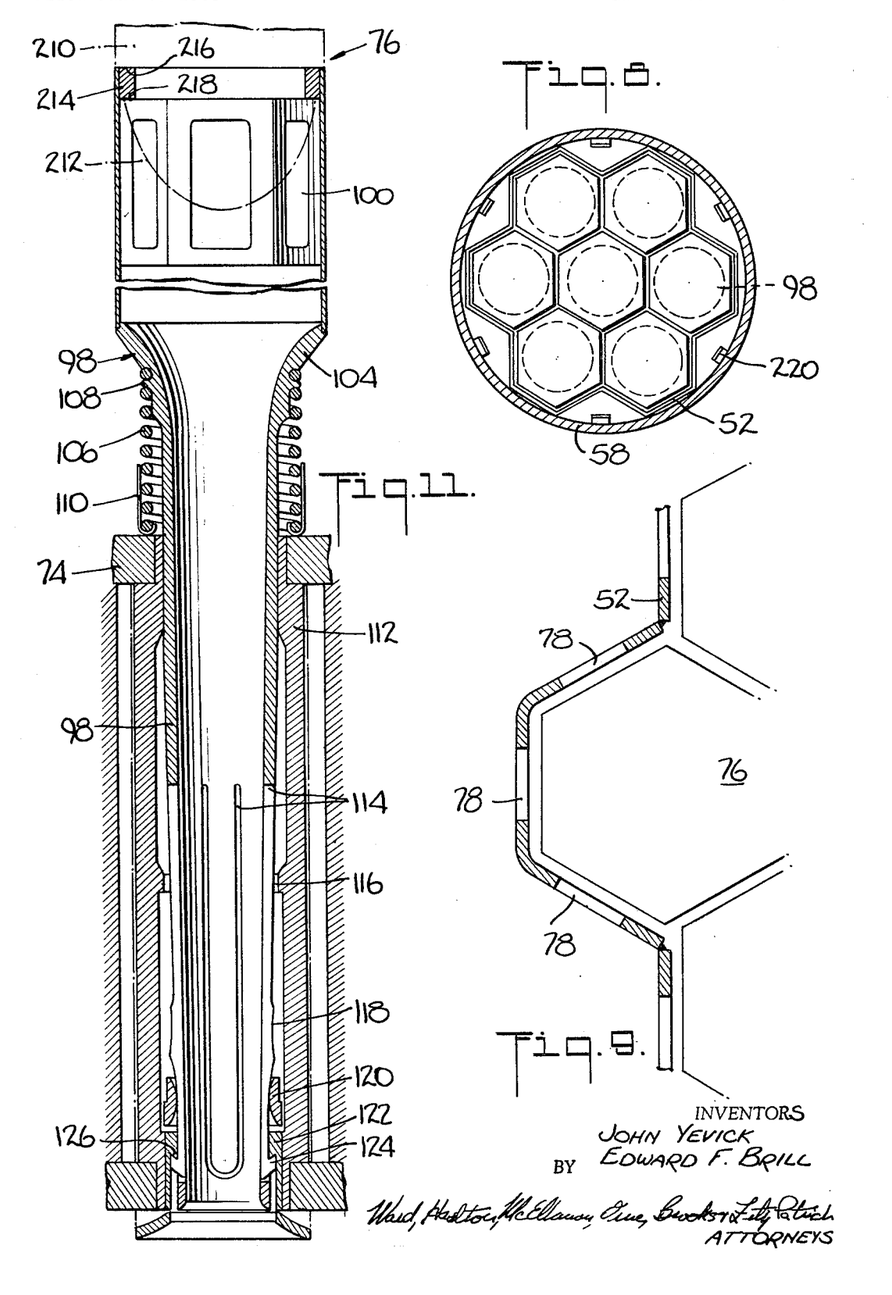
FIG. 8 is an enlarged cross-sectional view taken along the line 8—8 of FIG. 1 and showing a plurality of subassemblies disposed within a liner tube in the core decay region.
FIG. 9 is an enlarged detailed horizontal sectional view showing the construction of the polygon portion of the liner tube and the coolant outlet openings.
FIG. 11 is a detailed vertical sectional view showing the construction of the lower portion of a subassembly and hold-down means therefor.

The reactor vessel is filled with a plurality of elongated vertically extending liner tubes designated generally at 50 (FIG. 1) in which the subassemblies are disposed. The liner tubes are positioned in a substantially upwardly diverging conical array. Each liner tube is constituted with a lower polygon tube portion 52 having eighteen sides, twelve of which 54 are equal and longer than the other six equal sides 56, to permit closer spacing of the liner tubes, as best seen in FIG. 4. The polygon-shaped portion 52 of the liner 50 is joined by a transition section ring 56 (FIG. 1) to a second section 58 of the liner tube 50. As best seen in FIGS. 5, 6 and 8, the second section 58 of the liner tube 50 is of circular figuration. As best seen in FIG. 7, which is a sectional view taken along the line 7—7 of FIG. 1, the liner tube 50 further comprises a third upper section 60 which is of round configuration, but of a diameter greater than the section 58. It is noted that all core and radial blanket liners are identical.

It will be appreciated that in a fast reactor the power is concentrated in a relatively small volume in order to save critical material, and hence the structure is of particular importance. Considerable effects are caused by expansion, bowing or buckling of the structure. According to the present invention the liner tubes are disposed in a substantially conical array. That is, the liner tubes are closely spaced at the bottom of the reactor in the core region and they are spaced further apart at the top of the reactor for purposes of removing the fuel and control subassemblies. Preferably there is a conical angle of the order of about 0.8° between one liner tube with respect to the next adjacent liner tube. The subassemblies disposed within each liner tube are substantially parallel one with respect to the other, and therefore, the actual streaming loss is decreased.

Figure 10:
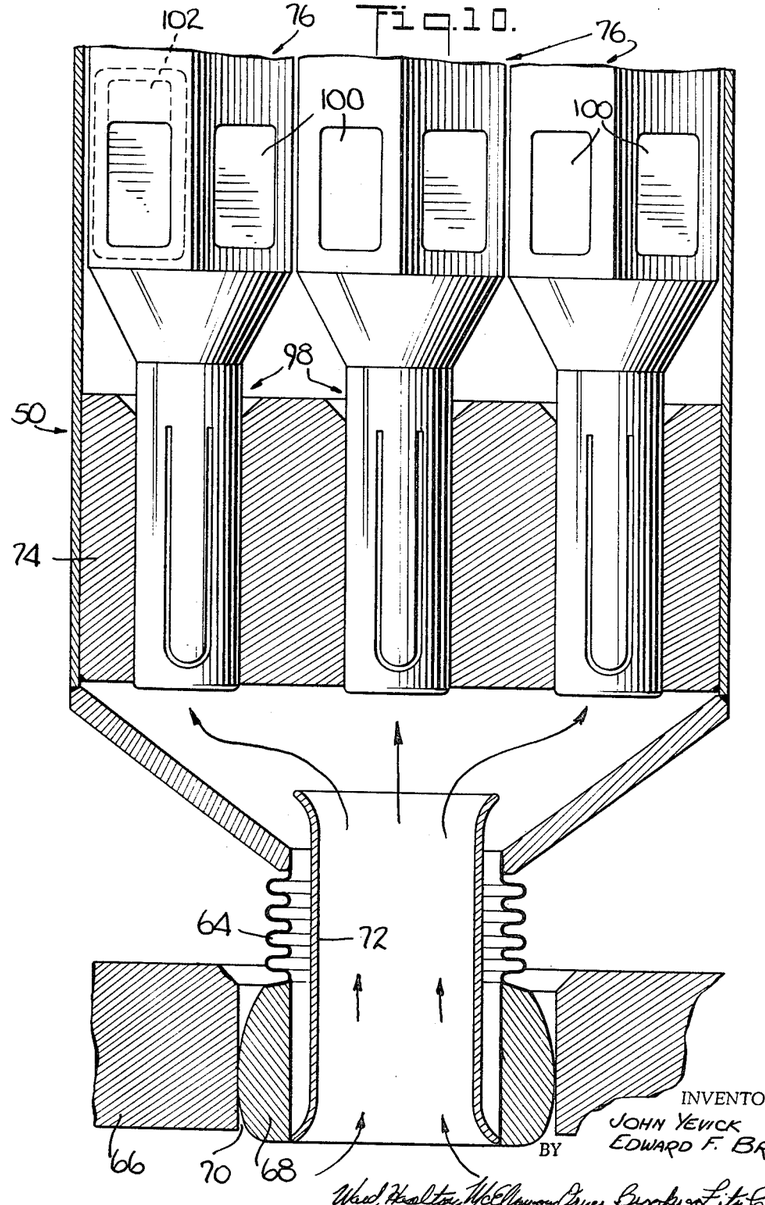
FIG. 10 is an enlarged vertical sectional view showing the details of construction of the lower end of the liner tube and the support means therefor.

The liner tubes 50 pass through the plug 48 and are free to expand a small amount within the plug, the top ends of the liner tubes being radially guided by the top of the plug. As best seen in FIG. 1, a second radial support grid 62 is located at the transition section 56 which may be, for example, about three feet above the top of the upper axial blanket 36. The lower ends of the liner tubes 50 are free to move radially with bowing of the core. This radial freedom is provided by means of bellows 64, disposed at the bottom of each liner tube where it engages the support plate 66, the liner tubes being axially fixed at the bottom. This arrangement produces a negative bowing coefficient and a negative liner tube axial expansion coefficient. Referring to FIG. 10, the liners 50 have a small spherical shaped bottom tube or ring 68 which fits into openings 70 in the pressure plate 66. Each liner tube is provided with a flow guide tubular member 72 for guiding the incoming liquid coolant or molten sodium, as shown by the arrows in FIG. 10. Each of the liner tubes 50 has an internal support plate 74 for supporting the bottom of the subassemblies, designated generally at 98. It is noted that the term "subassembly" as used herein broadly encompasses control rods and fuel subassemblies, both of which have external contours such as to make them interchangeable. The fuel subassembly may include many different forms of reactor fuels, for example it may include a solid fuel pin or a wrapper can filled with fuel pellets.

Figure 3:
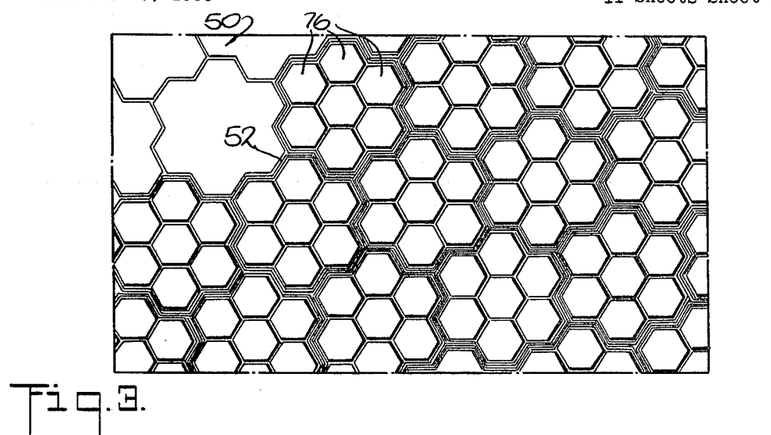
FIG. 3 is an enlarged fragmentary horizontal cross-sectional view of a medial portion of FIG. 2.

According to one embodiment of the present invention, hexagonal subassemblies 76 are arranged in a stable array in groups of seven inside each liner tube 50 as best seen in FIGS. 3, 4, 5 so that any one of the subassemblies can be removed from its respective liner tube through a small top plug. The core 30 ((FIG. 1) has a central liner or liner tube surrounded by six similar liners which are surrounded by twelve additional liners, thereby providing 133 core subassemblies. The radial blanket region adds another eighteen liner tubes in the first row and twenty-four in the second row thus, the total number of liner tubes for the core and radial blanket is sixty-one, and hence space is provided for a total of 427 subassemblies. This requires sixty-one top penetrations of the nuclear reactor for control and refueling procedures.

Figure 22:
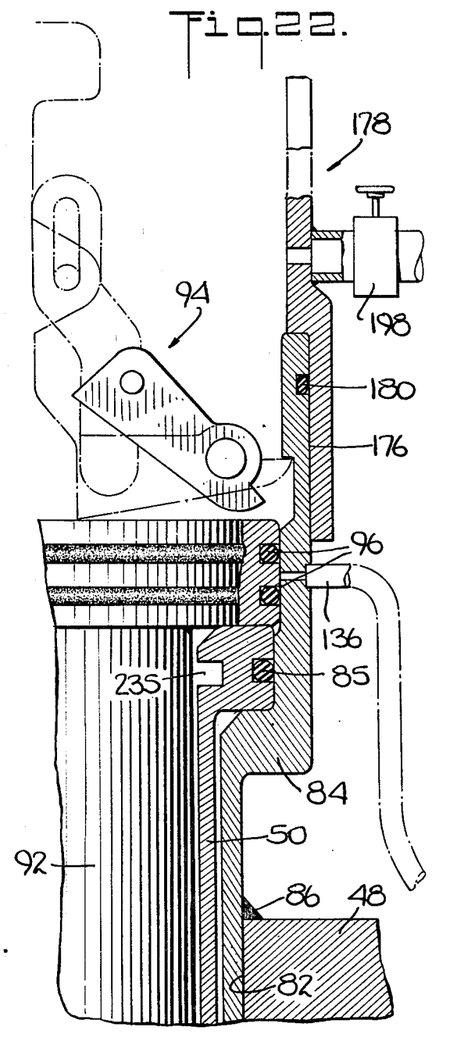
FIG. 22 is a side elevation, partially in section, of the top of a liner tube, a small plug, and means for locking the small plug in closed position.
Figure 25:
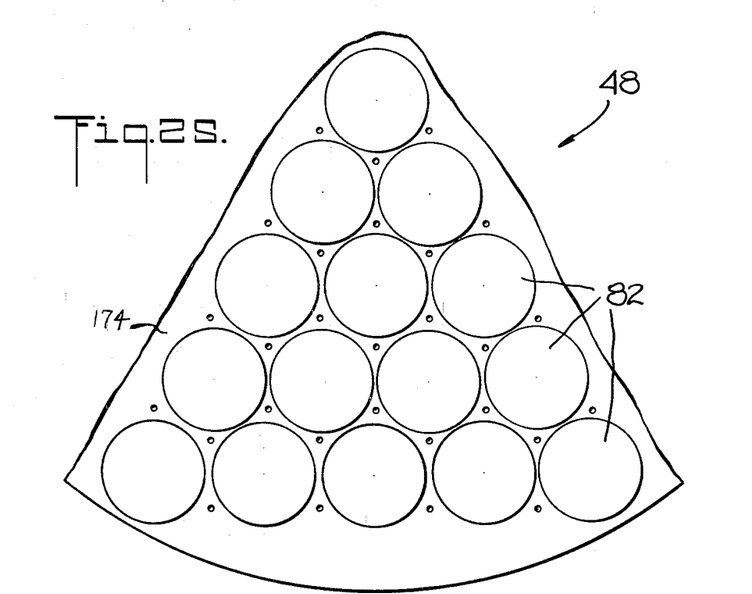
FIG. 25 is a plan view of the main plug showing the hemispherical holes for locating the common base of the subassembly and liner handling mechanisms.

Referring to FIG. 25, the main plug 48 is provided with sixty-one round equilaterally spaced top penetrations 82 for providing access to the liners containing the subassemblies. As seen in FIG. 22, a plug tube or sleeve 84 surrounds each liner 50 and is welded to the top of the plug 48 as at 86, as well as to the bottom of the plug, thereby effectively sealing the plug. Reverting to FIG. 1, the interior of the plug 48 includes carbon 88, or other shielding material, as well as insulation material and steel in the form of powder or granules which are compacted by careful procedure to fill all void spaces.

Actually, the plug 48 is a section of a hollow sphere, the under side and the outer or top side each having a radius of curvature. The holes 82 (FIG. 25), for the liner tubes are machined so that the center line of the holes passes through the center of the theoretical sphere giving a generally conical effect. A fuel handling mechanism is provided which fits over the holes 82 and forms a tight joint with the plug 48 during the refueling operation. The tube liners 50 which pass through the plug 48 are free to expand a small amount within lower end of the tubular plug sleeves 84. The top ends of the liner tubes 50 are radially guided by the sleeve 84 as seen in FIG. 22. An O ring 85 serves to seal tube 50 with respect to sleeve 84. The tube liners are removable through their respective hole 82 in the plug 48 for purposes of replacement in the event of structural damage to the tubes during the life of the reactor.

Still referring to FIG. 22, small top plugs 92 are provided for closing the top of each liner tube 50 and are held in position by self-locking clamps 94. A pair of O rings 96 form an effective seal between the top plug 92 and the plug sleeve 84. Instrumentation and monitoring of each individual subassembly may be handled through the small top plugs 92, if desired.

The coolant fluid, which may be sodium for example, enters the reactor at the inlets 18 (FIG. 1) and passes to the inlet plenum 20. Thence, the flow of sodium enters the flow guide 72 (FIG. 10) which passes through the pressure plate 66 and enters the liner tube at the bottom thereof. After which it divides into seven parallel paths one for each subassembly and passes upwardly therethrough. After passing out through the top of the subassemblies, the coolant is radially discharged from the liner tubes 50 through holes or slots 78 (FIG. 9), towards the top of the sides of the polygon-shaped portion 52 of the liner tubes into the large sodium pool 80 (FIG. 1) surrounding the liner tubes. Thence, the sodium passes through the outlet plenum 40 to the outlets 42 and on to the other components of the power system. The sodium above the support or pressure plate 66, can be drained from the reactor vessel by removing one or more of the liner tubes 50. The support plate 66, all thermal baffling and the melt-down pan 26 can be removed from the top of the reactor after the main plug 48 and all other inner members have been removed.

Referring again to FIG. 10, each subassembly 76 is provided with a lower subassembly nozzle designated generally at 98 through which passes the aforementioned coolant fluid. Due to the buoyancy of the coolant fluid in the pool 80, the pressure of the coolant in the inlet plenum 20 as well as the flow characteristics of the coolant there is an upward force component tending to lift the subassemblies. Therefore, a hold-down mechanism is necessary. However, such mechanism should permit axial expansion of the core and blanket subassemblies due to thermal expansion. As best seen in FIG. 11, the holddown mechanism comprises a subassembly orientation cam 104, a cushion spring 106, a spring retainer 108, and a spring guide 110. The nozzle 98 is inserted into a fixed portion 112, which is part of support plate 74. The holddown mechanism further comprises leaf springs 114, a delatching stop 116, a cam surface 118, a delatching holding ring 120, a latching thimble having a circular band 122, and a leaf spring latch 124. In order to lock the nozzle in its operating position within the liner tube it is pushed downwardly through the delatching holding ring 120 and the latching thimble 122, thereby depressing the six leaf springs 114 until they are past the circular band of the latching thimble 122, where they snap out and engage the thimble as at 126. When it is desired to remove the subassembly from its position in the liner tube 50, the nozzle 98 is initially pushed downwardly until the delatching holding ring 120 engages the cam surface 118 of the leaf spring 114, thereby disengaging the latches from the latching thimble 122. As the subassembly and nozzle are raised, the delatching stop 116 disengages the holding ring 120 and thus allows the nozzle to be removed. It is noted that the compression spring 106 acts between the upper portion of the support member 74 and the spring retainer 108 to provide axial tension in an upwardly direction on the nozzle 98, thereby resiliently retaining the subassembly 76 in position.

Alternately, the small top plugs 92 (FIG. 22) may be equipped with subassembly hold-down extensions, each of which may engage all the subassemblies in each liner tube to prevent them from moving upward during reactor operation.

Reactor control can be provided by replacing the central core subassemblies in selected liners by "moving control rods." That is, control rods can be placed in selected liners at the center between fuel subassemblies. The operation of these control rods can be effected by a mechanism on the top of the small liner plugs 92 in a normal manner, the control rods being interchangeable with the fuel subassemblies.

Figure 12:
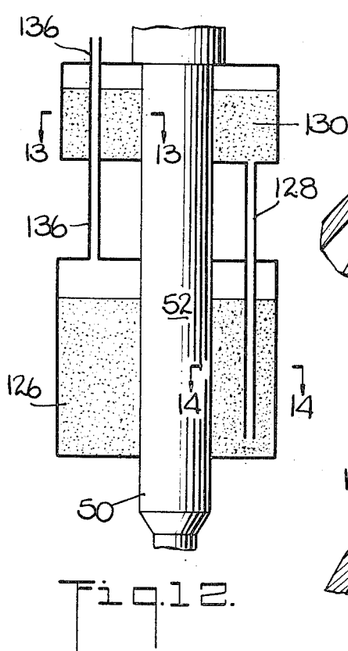
FIG. 12 is a side elevation showing somewhat schematically the liquid level control system for the nuclear reactor.
Figure 15:
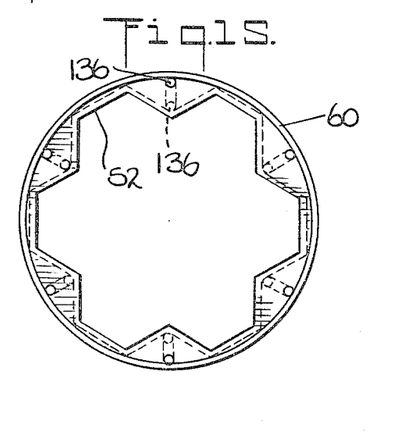
FIG. 15 is a plan view of the liner tube showing the gas supply and vent tube.
Figure 16:
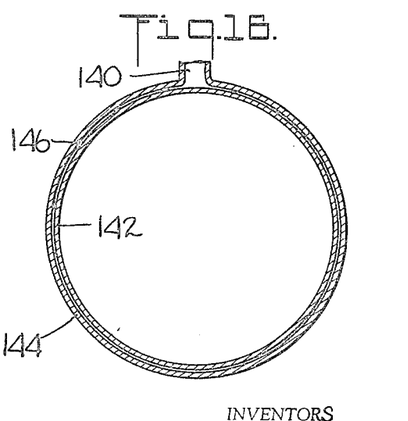
FIG. 16 is a horizontal sectional view of a liner tube showing an alternate embodiment employing a single gas supply connection.

In another embodiment of this invention control of the reactor is effected by means of regulating the level of liquid lithium disposed in the space between the liners 50. As best seen somewhat schematically in FIG. 12, the core portion 52 of the liner tube 50 is surrounded by a bath 126 of lithium which is connected through a tube 128 to an upper reservoir 30 of lithium. The bath 126 is formed by means of an alternate liner tube 132 (FIG. 14) and the tube 128 actually passes therethrough as shown. The reservoir 130 (FIG. 12) is formed by a wall member 134 and a gas supply and vent pipe 136 passes therethrough. The pipe 136 extends upwardly adjacent the side wall of the polygon portion 52 of the liner tube as seen by the dotted line in FIG. 15. As the pipe proceeds upwardly through the round portion of the liner tube it is angled outwardly as shown by the dotted lines in FIG. 15 and at the top of the liner tube 60 the pipe 136 exists from the small top plug 92 as shown in FIG. 22. Preferably an inert gas is employed such as argon, for example. In operation the tube 136 contains gas under pressure which flows inwardly to displace the lithium in the space 126 (FIG. 12) surrounding the polygon liners 52. The displaced lithium flows upwardly through the pipe 128 to the reservoir 130, and hence less lithium is in the area immediately surrounding the reactor core. It will be appreciated that lithium is a neutron absorber and hence the presence thereof slows down a nuclear chain reaction. Thus, the presence of lithium adjacent the reactor core slows down the reaction and the absence thereof allows the reaction to speed-up. When additional lithium is desired in the core region, the pressure in the gas supply line 136 (FIG. 12) is reduced and lithium flows downwardly from the reservoir 130 through the tube 128 to the bath 126 surrounding the core portion 52 of the liner 50. It is noted that this embodiment requires six gas supply lines for each liner assembly. Another embodiment is shown in FIG. 16 which requires a single gas connection 140 for all of the subassemblies in a liner. In this embodiment the pipe 136 of FIG. 12 is dispensed with and the upper round sections 58 and 60 of the liner tubes 50 are provided with thin concentric walls 142 and 144 between which the gas flows downwardly and into contact with the upper surface of the bath 126 (FIG. 12). Concentric tube spacers 146 (FIG. 16) are supplied to keep the two tubes spaced one with respect to the other. The operation of this embodiment is similar to that described above in connection with FIGS. 13–15 inclusive.

Figure 13:
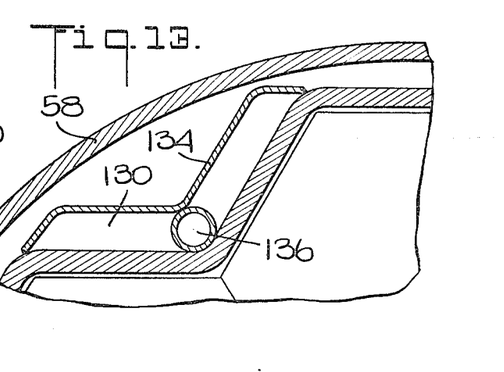
FIG. 13 is an enlarged horizontal sectional view taken substantially along the line 13—13 of FIG. 12 and showing the liquid reservoir as well as the gas supply and vent line.
Figure 14:
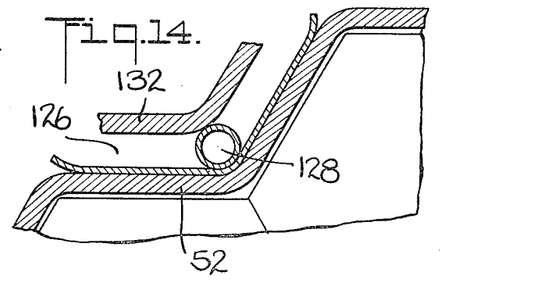
FIG. 14 is an enlarged horizontal sectional view taken substantially along the line 14—14 of FIG. 12 and showing the space between liner tubes for the control liquid, and also showing the connecting tube leading to the liquid reservoir.
Figure 17:
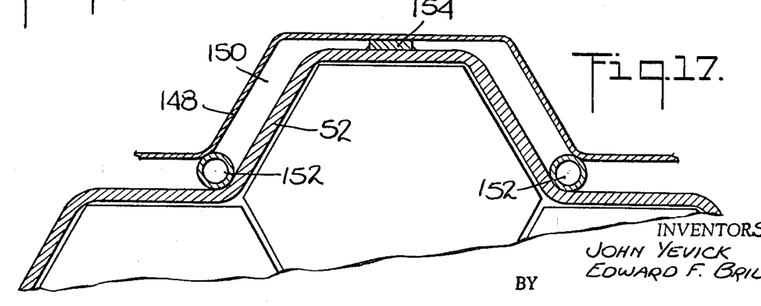
FIG. 17 is an enlarged horizontal sectional view of the polygon portion of the liner tube showing still another embodiment of the fluid level control system.

Referring to FIG. 17 there is shown another form of the invention wherein the lithium space 150 corresponding to the lithium space 126 (FIG. 12) is formed by a conical polygon wrapper 148 concentrically disposed about the polygon portion 52 of the liner tube, said wrapper being connected to the polygon portion 52 by spacers 154, this embodiment operates in a similar manner to that described in connection with FIGS. 13–15 inclusive, and pipes 152 corresponding to pipes 128. Due to the closer spacing of the liner tubes towards their lower ends, pipes 152 may be flattened at their lower ends in order to fit between the liner tube wall and the conical polygon wrapper.

It will be appreciated that in the aforementioned lithium control systems there is a safety feature wherein the device is what is known as "fail safe." That is, in the event of mechanical failure resulting in loss of gas pressure, the liquid lithium will automatically drain to the reactor core and slow down the nuclear reaction. Upon restoration of the gas pressure the reactor will automatically return to normal operation.

Figure 24:
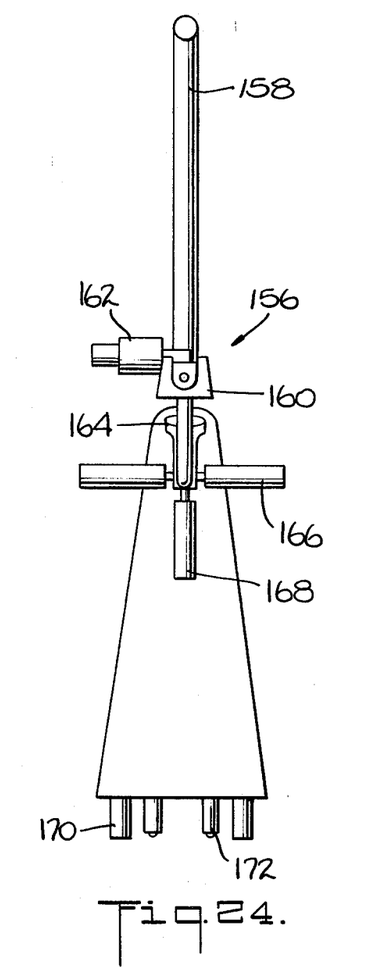
FIG. 24 is a common base for the subassembly and the liner handling mechanisms.

It will be appreciated that the subassemblies 50 have to be replaced periodically, and therefore, means are provided for their removal and replacement. Also, during the life of the reactor, the liner tubes may require replacement, and hence provision for their replacement is necessary. Referring to FIG. 24, there is illustrated a common support base designated generally at 156 which is used for both the fuel subassembly handling mechanism and the liner handling mechanism. This base comprises a crane lifting bar 158, a trunnion support 160 for fuel subassembly handling and liner handling mechanisms and a locking pin solenoid 162. A spherical pivot 164 is provided having an angle adjusting actuator 166 and a raising and lowering actuator 168. At the foot of the common base 156 are supporting legs 170 and hemispherical dowel locators 172 which are adapted to fit into the spherical holes 174 (FIG. 25) of the main plug 48 for purposes of accurately locating the mechanism at every refueling position.

Figures 20, 21:
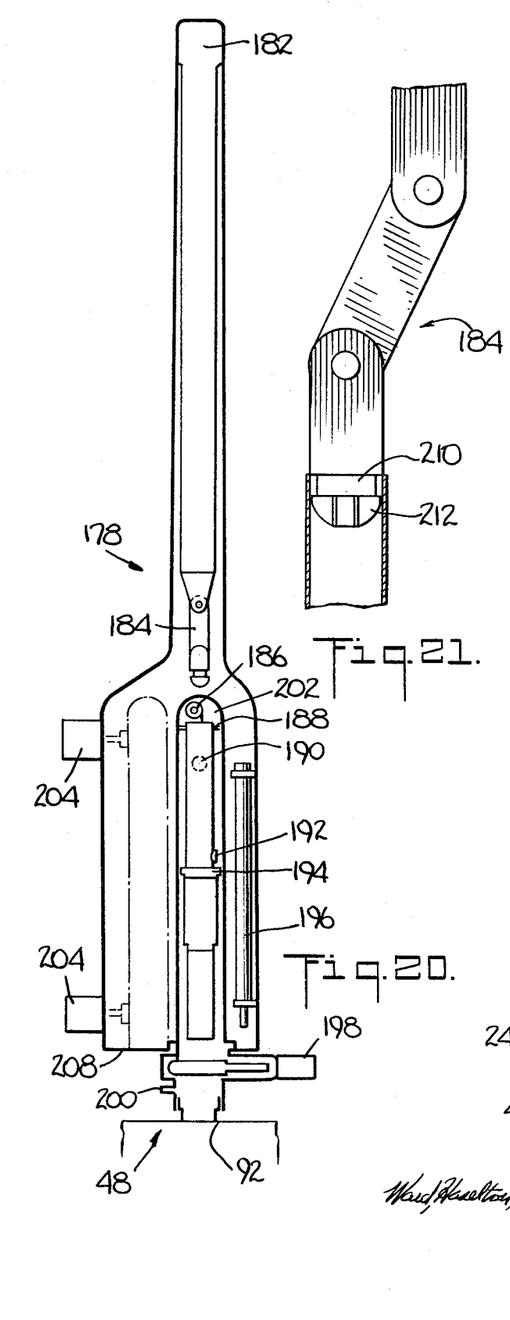
FIG. 20 is a side elevation showing the subassembly and small plug handling mechanism.
FIG. 21 is an enlarged detailed view showing the parallel axis gripper for the subassembly handling mechanism.

Referring to FIG. 20 the subassembly handling mechanism 178 comprises driving means 182 which are associated with the parallel axis gripper end 184. The cable hoist 186 is provided for removal of the small top plug 92 (FIG. 22). Referring again to FIG. 20 there is provided a guide ring 188 located on the control rod drive. A trunnion 190 is provided for mounting on the trunnion support 160 of the common support base 156 (FIG. 24). A power level disconnect 192 is located adjacent the control rod guide, and a guide member 194 is provided for guiding the small top plug 92 during removal. A rack 196 is contained in the mechanism for holding a subassembly during the refueling operation.

In order to prevent contamination of the inside of the reactor, a vacuum and gas sweep circuit is provided for purifying the atmosphere adjacent the subassemblies prior to removal. The inlet portion of the circuit comprises a valve 198 for a gas supply line which contains an inert gas such as argon, for example. An outlet 200 leads to a vacuum source for removal of the gases. Still referring to FIG. 20, a bell housing 202 is provided for receiving the small top plug 92 during the refueling operation. Actuators 204 serve to shift the bell 202 between a remote position and a position adjacent the liner tube.

In operation, when it is desired to replace a subassembly, the trunnion 190 of the subassembly handling mechanism 178 (FIG. 20) is mounted on the trunnion support 160 of the common support base 156 (FIG. 24). A crane (not shown) lowers the entire mechanism until the feet 172 of the base 156 fit into the selected hemispherical guide holes 174 (FIG. 25) located on the top of the main plug 48. This mechanism is adapted to service all of the liner tubes regardless of their radial position with respect to the reactor centers. The support base 156 is so constructed that the total weight is distributed over a wide expanse of the main plug so that, even when placed at the maximum angle, the structure is self-supporting and independent of the building crane. Actuators 166 and 168 (FIG. 24) position the entire mechanism at the required angle with respect to the liner tube. When the subassembly handling mechanism 178 is so seated on the top of the plug, it is ready for an inclined downward motion which enables the lower end of the mechanism to engage the top of the plug sleeve 84 as shown in FIG. 22. The top portion of the plug sleeve 84 has a slightly tapered machined outer surface 176 which is adapted to be engaged by the subassembly handling mechanism 178 when it is placed thereover, an O ring 180 being provided for sealing purposes. Thence, the space between the small top plug 92 and the valve 198 is evacuated through the outlet 200, and the valve 198 is opened. The cable hoise 186 is adapted to pick up the small top plug 92 and lift it into the bell housing 202. Thence, the actuator 204 (FIG. 20) moves the bell housing to a side position, sliding it along seal plate 208.

After the small top plug has been moved inside the bell housing 202, the subassembly handling mechanism is ready to transfer a subassembly. A parallelogram-type fuel handling mechanism designated generally at 184 (FIG. 21) is employed which contains an electrically operated self-seeking gripper head 210 which contains flexible fingers 212 for gripping the subassemblies. As best seen in FIG. 11, the upper portion of the liner tube 50 is provided with a subassembly gripping ring 214 shaped for maintaining correct angular position of the subassembly. A tight contact as at 216 is maintained to permit small angular support of the subassembly as at 218. It is noted that all fuel, blanket, and control rods have similar top rings for handling purposes.

Figure 18:
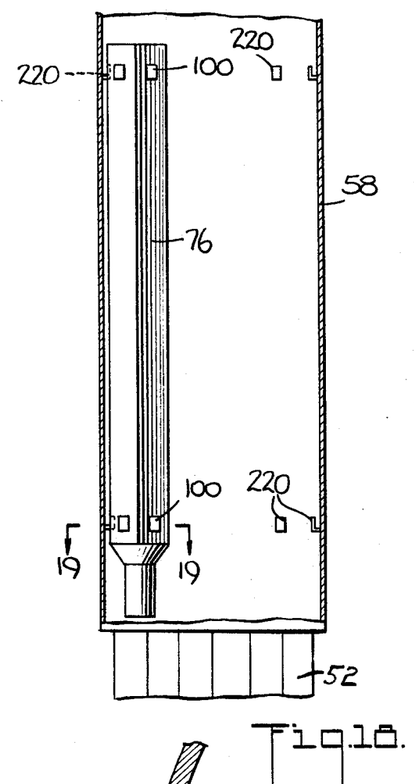
FIG. 18 is a side elevation, partially in section, of a subassembly in its storage or decay position within its liner tube.
Figure 19:
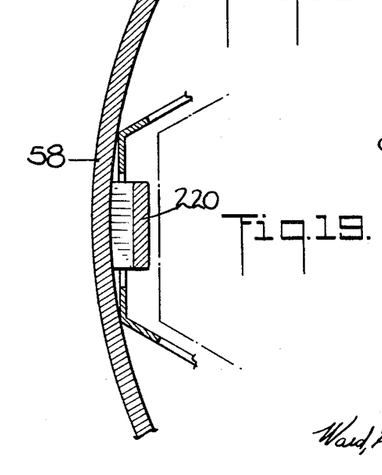
FIG. 19 is an enlarged view showing details of the supporting structure for holding the subassembly in position for storage or decay within the liner tube.

A new subassembly, having previously been placed in the rack 196 of the subassembly handling mechanism, is removed therefrom and lowered into the liner tube 50 and placed in the decay or storage region 58 of the liner tube 50, as best seen in FIG. 18. Lugs 220 are anchored on the inside wall of the tubular portion 58 of the liner tube 50 for supporting the subassemblies in the decay or storage region. The subassemblies are provided with mating indented or recessed portions 100 which are adapted to engage the lugs 220. Thence, a hot subassembly 76 is removed from the core 30 (FIG. 1) and is placed in a storage position adjacent the new subassembly. The new subassembly is then removed and placed into the core of the reactor, and the decayed subassembly, which has been in storage since the last refueling operation, is removed from the reactor decay region and placed in the subassembly rack 196 (FIG. 20) of the subassembly handling mechanism 178.

Figure 26:
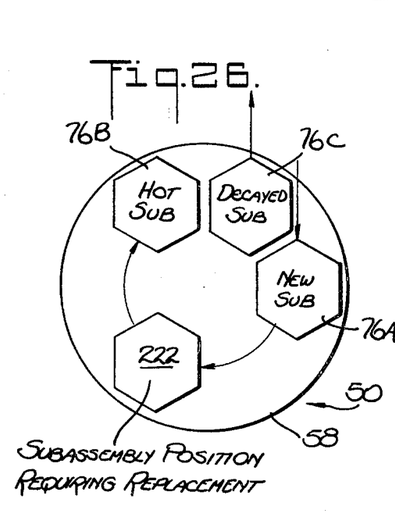
FIG. 26 is a plan view showing schematically a system for replacing a subassembly.

Then the bell housing 202 is moved back over the plug sleeve and the cable mechanism 186 lowers the small top plug back into position. The valve 198 is closed and the space between the valve and the top of the small top plug is swept with new argon gas. The subassembly handling mechanism can then be moved to the canning station (not shown) where it transfers the decayed subassembly for reprocessing. The cycle is repeated until all liners requiring refueling have been serviced. It is noted that normal refueling operations require replacement of only a few subassemblies depending upon their residence time and location within the reactor. Hence, a relatively few liner tubes will be opened at each refueling cycle. The above refueling sequence is illustrated in FIG. 26, which is a view looking downwardly into the core decay region of the line tube 50, wherein the position of the subassembly requiring placement is designated at 222. The new subassembly 76A is lowered into the liner tube in the storage or decay region. A hot subassembly 76B is removed from the core and placed in the storage region adjacent the new one 76A. Then the new subassembly 76A is placed in the core in the vacant position 222. The decayed subassembly 76C which has been in storage, since the last refueling period, is removed from the reactor and placed in the rack 196 of the subassembly handling mechanism 178.

Figure 27:
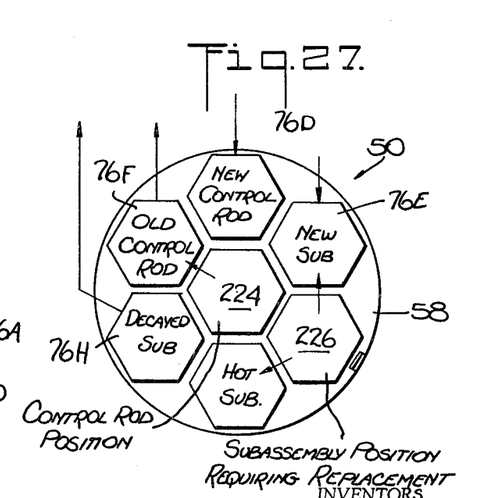
FIG. 27 is a plan view showing schematically a system for replacing a control rod and a fuel subassembly or two fuel subassemblies.

Another refueling cycle which may be employed is illustrated in FIG. 27, which also shows a plan view of the core decay region 58 of the liner tube 50. This method of refueling requires a gripper similar to gripper mechanism 184 (FIG. 21), except that it requires a double head gripper whereby two subassemblies may be simultaneously raised or lowered. Referring again to FIG. 27, a new control rod 76D and a new fuel subassembly 76E are lowered into the storage or decay region 58 of the liner tube 50. The old control rod 76F is moved from the control rod position 224 to the decay region as shown, and a hot subassembly 76G is moved from its position 226 in the reactor core to the decay region, as shown. Thence, the control rod 76F and a decayed subassembly 76H which has been in storage since the last refueling period are removed from the reactor storage position and brought up into the subassembly handling mechanism.

Figure 23:
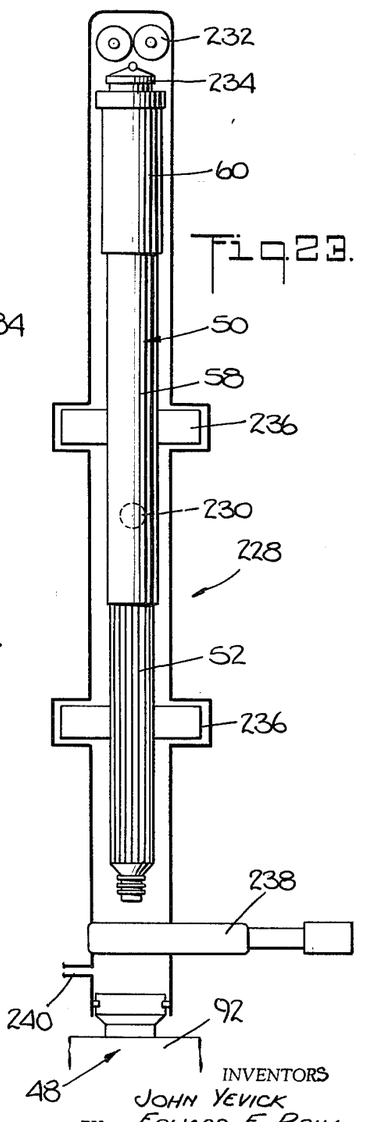
FIG. 23 is a side elevation of a liner handling mechanism.

Referring next to FIG. 23 there is shown a liner handling mechanism designated generally at 228. It will be appreciated that the liner tubes normally do not require replacement. However, during the life of a reactor it is quite possible that damage may occur thereto and hence its replacement becomes necessary. The liner handling mechanism 228 is adapted to operate in conjunction with the common support base 156 (FIG. 24). The liner handling mechanism 228 is provided with a trunnion 230 for mounting on the trunnion support 160 of the common base 156. The liner handling mechanism 228 further comprises a cable winder 232 associated with a liner gripper 234 which grips the under portion of a liner tube 50. The side of the handling mechanism is provided with guides 236 which are power shifted rollers. At the base of the handling mechanism is a valve 238 and a vacuum and gas sweep outlet 240 which operate in a manner similar to that described hereinbefore in connection with the valve and line 198 and 200 (FIG. 20). After the space between the small top plug and the valve 238 has been evacuated, the valve is opened and the liner gripper 234 is brought down into engagement with the gripper groove 235 (FIG. 22) of the liner tube 50. The liner tube is removed and retained within the handling mechanism and a new liner is inserted into the reactor. After which, the valve is closed and the space between the valve and the main plug is swept with new argon gas and the small top plug is replaced. The liner handling mechanism is then moved to a position remote from the reactor. It is noted that the subassembly handling mechanism 178 and the liner handling mechanism 228 are stored in decay pits whereas the common supporting base 156 does not require storage in a decay pit.

It will be appreciated that by providing a subassembly decay position 58 above the axial blanket in each liner tube 50, substantial handling of subassemblies is eliminated. This method of handling the subassemblies is preferable to that employed hereinbefore wherein subassemblies were removed from the core and placed in positions around the radial periphery of the reactor. Such a move required liquid metal cooling while the subassembly was being transferred within or being removed from the reactor. According to the present invention, the fuel subassembly is allowed to remain in the decay region for a period of time, and hence liquid cooling is not required when the subassembly is removed from the reactor. However, it may be desirable to employ some simple method of cooling the subassemblies during the "out of the reactor" handling time before they are placed in the canning station. A cooling medium such as gas could be used, if desired.

Although particular embodiments of the invention are herein disclosed for purposes of explanation, further modifications thereof after study of this specification, will be apparent to those skilled in the art to which the invention pertains. Reference should accordingly be had to the appended claims in determining the scope of the invention.

What is claimed and described to be secured by Letters Patent is:

1. A nuclear reactor comprising a first region containing reactor core and blanket portions, a second superadjacent region containing a core decay region, a plurality of liner tubes, each tube containing a plurality of subassemblies, each of said tubes having a substantially constant cross-sectional area throughout the portion thereof disposed within the first region and a larger second substantially constant cross-sectional area throughout the portion thereof disposed within said second region, means for moving selected subassemblies from the first region, to the second region, and means for retaining said selected subassemblies within said second region.

2. A nuclear reactor comprising a first region containing reactor core and blanket portions, a second superadjacent region containing a core decay region, a plurality of liner tubes, each tube containing a plurality of subassemblies, said liner tubes being disposed in a substantially upward diverging conical array, each of said tubes having a substantially constant cross-sectional area throughout the portion thereof disposed within the first region and a larger second substantially constant cross-sectional area throughout the portion thereof disposed within said second region, means for moving selected fuel subassemblies from the first region to the second region, and means for retaining said selected fuel subassemblies within said second region.

3. A nuclear reactor comprising a first region containing reactor core and blanket portions, a second superadjacent region containing a core decay region, a plurality of liner tubes, each tube containing a plurality of subassemblies, each of said liner tubes having a polygon shape throughout the portion thereof disposed within the first region and a substantially round shape throughout the portion thereof disposed within said second region, said fuel subassemblies being movable from the first region to the second region, supporting means being disposed within said second region, support mating means being disposed on the peripheral surface of the subassemblies for retaining said subassemblies within said second region.

4. A nuclear reactor comprising a first region containing reactor core and blanket portions, a second superadjacent region containing a core decay region, a third superadjacent region with respect to said second region, a plurality of liner tubes, each of said tubes containing a plurality of subassemblies, said liner tubes being disposed in a substantially upwardly diverging conical array, each of said tubes having a substantially constant cross-sectional area throughout the portion thereof disposed within the first region and a larger second substantially constant cross-sectional area throughout the portion thereof disposed within said second region and a larger third substantially constant cross-sectional area throughout the third portion thereof disposed within said third portion, selected subassemblies being movable between the first region and the second region, and means for retaining said selected subassemblies within said second region, a main plug adapter to seal the top of said nuclear reactor adjacent the top of the third region thereof, said main plug having a plurality of openings therein corresponding to the plurality of liner tubes, said liner tubes and said openings being in linear alignment, a plurality of small plugs for closing said plug openings.

5. A nuclear reactor comprising a first region containing a reactor core and blanket portions, a second superadjacent region containing a core decay region, a third superadjacent region with respect to said second region, a plurality of liner tubes, each of said tubes containing a plurality of subassemblies, said liner tubes being disposed in a substantially upwardly diverging conical array, each of said tubes having a polygon shape of substantially constant cross-sectional area throughout the portion thereof disposed within the first region and a substantially round shape of a larger second substantially constant cross-sectional area throughout the portion thereof disposed within said second region, and a substantially round shape of a larger third substantially constant cross-sectional area throughout the third portion thereof disposed within said third portion, selected subassemblies being movable between the first region and the second region, hook means on the inside walls of said liner tubes in the second region, and mating indented portions on the outside surface of said subassemblies for retaining said subassemblies within said second region, a main plug adapted to seal the top of said nuclear reactor adjacent the top of the third region thereof, said main plug having a plurality of openings therein corresponding to the plurality of liner tubes, said liner tubes and said openings being in linear alignment, and a plurality of small top plugs for effecting closure of said openings.

6. A nuclear reactor comprising a first region containing reactor core and blanket portions, a second superadjacent region containing a core decay region, a third region superadjacent said second region, a plurality of liner tubes extending through said three regions, each of said tube containing a plurality of subassemblies, said liner tubes being disposed in a substantially upwardly diverging conical array, each of said tubes have a substantially constant cross-sectional area throughout the portion thereof disposed within the first region and a larger second substantially constant cross-sectional area throughout the portion thereof disposed within said second region and a larger third substantially constant cross-sectional area throughout the portion thereof disposed within said third region, said subassemblies being movable between said first, second and third regions, means for retaining selected subassemblies within said second region, a main plug for closing the top of said third region, said main plug having a plurality of substantially vertically extending openings, said openings being substantially in longitudinal alignment with said liner tubes for the removal of selective subassemblies, each of said openings having a small top plug for closing each of said openings in said main plug, and releasable locking means for retaining said small plugs in their closed positions.

7. A nuclear reactor comprising reactor core and blanket portions, a plurality of liner tubes extending through said portions each of said tubes containing a plurality of subassemblies, said tubes being disposed in a substantially upwardly diverging conical array, said subassemblies being adapted to be moved linearly within said liner tubes respectively, main plug for closing the top of said nuclear reactor, said main plug having a plurality of openings therein, said openings being in linear alignment with said liner tubes, whereby said subassemblies may be removed through said openings respectively, each of said openings having a plug sleeve, said liner tube being in sealed engagement with said plug sleeve, a small top plug for each of said plug sleeves each of said small top plugs being engageable with its corresponding plug sleeve in sealed engagement, and locking means for retaining said plugs in their closed positions.

8. A nuclear reactor comprising a first region containing reactor core and blanket portions, a second superadjacent region containing a core decay region, a plurality of liner tubes, each of said tubes being of polygon configuration and having 12 walls of one length and 6 walls of a second length throughout the portion thereof disposed within the first region, said liner tubes having a second portion having a substantially circular configuration throughout the portion thereof disposed within said second region, seven hexagonally-shaped subassemblies being positionable within each of said liner tubes in closely spaced relationship one with respect to the other, throughout the portion of said liner tube disposed within the first region, said subassemblies being movable from said first region to said second region, and means for retaining selected subassemblies within said second region.

9. A nuclear reactor vessel comprising a core having a central grouping of 7 subassemblies contained within a center liner tube, 6 additional liner tubes surrounding said center liner tube, 12 liner tubes surrounding said 6 liner tubes, each of said liner tubes containing 7 subassemblies, thereby providing 133 core subassemblies, a radial blanket surrounding said core comprising 18 liner tubes in the first row and 24 liners tubes in the second row, each of said liner tubes having 7 fuel subassemblies, said liner tubes being disposed in a substantially upwardly diverging conical array, having a conical angle of the order of about 0.8 degree one with respect to the next adjacent one, a main plug for closing the top portion of said reactor vessel, said main plug having 61 longitudinal penetrations, one for each liner tube for the removal or replacement of subassemblies.

References Cited
UNITED STATES PATENTS

| | | | |
|---|---|---|---|
| 2,852,456 | 9/1958 | Wade | 176—18 |
| 2,975,117 | 3/1961 | Zinn | 176—18 |
| 3,201,318 | 8/1965 | Dickinson | 176—30 |
| 3,212,982 | 10/1965 | Astley et al. | 176—40 |
| 3,230,146 | 1/1966 | Astley et al. | 176—28 |

FOREIGN PATENTS

| | | |
|---|---|---|
| 828,055 | 2/1960 | Great Britain. |
| 877,679 | 9/1960 | Great Britain. |
| 894,228 | 4/1961 | Great Britain. |

CARL D. QUARFORTH, *Primary Examiner.*

H. E. BEHREND, *Assistant Examiner.*